(12) United States Patent
Hagmeier et al.

(10) Patent No.: US 8,706,633 B2
(45) Date of Patent: Apr. 22, 2014

(54) REMITTANCE SYSTEM WITH IMPROVED SERVICE FOR UNBANKED INDIVIDUALS

(75) Inventors: Shawn Hagmeier, St. Peters, MO (US); Mark Wiesman, Chesterfield, MO (US); César Espinoza, Mexico City (MX); Miguel Cintron, Palmetto Bay, FL (US)

(73) Assignee: Mastercard International Incorporated, Purchase, NY (US)

( * ) Notice: Subject to any disclaimer, the term of this patent is extended or adjusted under 35 U.S.C. 154(b) by 349 days.

(21) Appl. No.: 12/940,671

(22) Filed: Nov. 5, 2010

(65) Prior Publication Data
US 2012/0116970 A1 May 10, 2012

(51) Int. Cl.
*G06Q 40/00* (2012.01)
(52) U.S. Cl.
USPC ............................................. 705/44; 705/39
(58) Field of Classification Search
USPC ...................................................... 705/39, 44
See application file for complete search history.

(56) References Cited

U.S. PATENT DOCUMENTS

| | | | |
|---|---|---|---|
| 7,182,252 B1 | 2/2007 | Cooper et al. | |
| 7,334,724 B2 | 2/2008 | Pallares | |
| 2002/0016763 A1* | 2/2002 | March | 705/39 |
| 2002/0077978 A1* | 6/2002 | O'Leary et al. | 705/40 |
| 2002/0082962 A1 | 6/2002 | Farris et al. | |
| 2002/0104878 A1* | 8/2002 | Seifert et al. | 235/379 |
| 2002/0152176 A1 | 10/2002 | Neofytides et al. | |
| 2003/0028491 A1* | 2/2003 | Cooper | 705/64 |
| 2003/0065805 A1 | 4/2003 | Barnes, Jr. | |
| 2003/0080185 A1* | 5/2003 | Werther | 235/380 |
| 2003/0233317 A1 | 12/2003 | Judd | |
| 2004/0139019 A1* | 7/2004 | Cooper | 705/44 |
| 2005/0114367 A1* | 5/2005 | Serebrennikov | 707/100 |
| 2005/0167481 A1* | 8/2005 | Hansen et al. | 235/379 |
| 2005/0251472 A1* | 11/2005 | Sutton et al. | 705/38 |
| 2006/0006224 A1 | 1/2006 | Modi | |
| 2006/0165060 A1* | 7/2006 | Dua | 370/352 |
| 2006/0287953 A1 | 12/2006 | Chauhan | |
| 2007/0050291 A1* | 3/2007 | Avazian et al. | 705/42 |
| 2007/0233615 A1* | 10/2007 | Tumminaro | 705/75 |
| 2008/0249910 A1* | 10/2008 | Hill et al. | 705/35 |
| 2008/0249927 A1* | 10/2008 | Rethorn et al. | 705/39 |
| 2008/0249928 A1* | 10/2008 | Hill et al. | 705/39 |
| 2008/0249929 A1 | 10/2008 | Hill et al. | |
| 2008/0249930 A1* | 10/2008 | Hill et al. | 705/39 |
| 2008/0249933 A1* | 10/2008 | Rethorn et al. | 705/40 |

(Continued)

OTHER PUBLICATIONS

Notification of Transmittal of the International Search Report and the Written Opinion of the International Searching Authority, or the Declaration, dated Dec. 8, 2011, for International Application No. PCT/US2011/050360, 9pgs.

*Primary Examiner* — Kenneth Bartley
(74) *Attorney, Agent, or Firm* — Buckley, Maschoff & Talwalkar LLC

(57) ABSTRACT

A service provider computer receives a request for a transfer of funds from a sender to a recipient. The service provider computer makes a data record about the transaction available to a receiving financial institution. The receiving financial institution receives a visit from the recipient, issues a new payment card account to the recipient, and communicates the account number for the new account to the service provider computer. The service provider computer initiates a payment transaction in a payment card system to route the requested funds transfer from a payment card account belonging to the sender to the newly issued payment card account for the recipient.

7 Claims, 5 Drawing Sheets

(56) References Cited

U.S. PATENT DOCUMENTS

| | | |
|---|---|---|
| 2008/0249935 A1 | 10/2008 | Chan et al. |
| 2008/0249937 A1* | 10/2008 | Walls et al. ............... 705/43 |
| 2009/0119159 A1 | 5/2009 | Reardon et al. |
| 2009/0150294 A1* | 6/2009 | March et al. ............... 705/67 |
| 2009/0319425 A1 | 12/2009 | Tumminaro et al. |
| 2010/0057615 A1 | 3/2010 | Klett |
| 2010/0287100 A1* | 11/2010 | Avazian et al. ............. 705/44 |
| 2012/0016795 A1* | 1/2012 | Hill et al. ................. 705/39 |
| 2012/0317030 A1* | 12/2012 | Hill et al. ................. 705/44 |
| 2013/0191284 A1* | 7/2013 | Carlson et al. ............. 705/44 |
| 2013/0282585 A1* | 10/2013 | Walls et al. ............... 705/44 |

* cited by examiner

REMITTANCE SYSTEM WITH IMPROVED SERVICE FOR UNBANKED INDIVIDUALS

BACKGROUND

Embodiments disclosed herein relate to remittance systems. In particular, some embodiments relate to methods, apparatus, systems, means and computer program products for implementing a remittance system on the basis of a payment card system.

Many individuals regularly send money to family or friends either domestically or across international borders. The total annual volume of international person-to-person remittances is measured in the hundreds of billions of U.S. dollars (including transactions that involve U.S. dollars and transactions that do not involve U.S. dollars) and is increasing from year to year.

Conventional remittance channels may be expensive and/or potentially unreliable. To overcome these disadvantages, it has been proposed to base a remittance system on a payment card system, such as the very well known, worldwide system operated by MasterCard International Inc., which is the assignee hereof. In particular, MasterCard has introduced a service known as "MoneySend" by which remittances are routed from the remittance sender's payment card account to the remittance recipient's payment card account via the MasterCard payment system. U.S. published patent application no. 2008/0249929, also assigned to MasterCard, describes a remittance system based on a payment card system. The '929 published application is incorporated herein by reference.

The present inventors have now recognized that a remittance system based on a payment card system may be enhanced to provide improved services for individuals who lack payment card accounts.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, the sender in a proposed remittance transaction may designate as a recipient an individual who does not have a payment card account. The sender may designate the sender's payment card account as the source of funds for the remittance transaction. A remittance service provider may initiate an authorization request in the payment card account system to place a hold on the sender's payment card account in an amount sufficient to cover the remittance transaction. The service provider may then issue a unique transaction identification code to identify the proposed remittance transaction and may establish a data file or record for the proposed transaction. The sender may receive the transaction identification code from the service provider and may communicate it to the recipient. The recipient may visit a branch office of a financial institution (the receiving FI) that participates in the remittance system. The recipient provides the transaction identification code to the receiving FI, which uses the transaction identification code to access the relevant data record in the service provider's computer system. The receiving FI then issues a new payment card account to the recipient and communicates the payment card account number for the new account to the service provider. The service provider initiates a payment transaction in the payment card system to route the funds to be transferred from the sender's payment card account to the recipient's (newly issued) payment card account. Subsequent remittances from the sender to the recipient may be routed directly in the payment card system to the recipient's payment card account.

Figure 1:
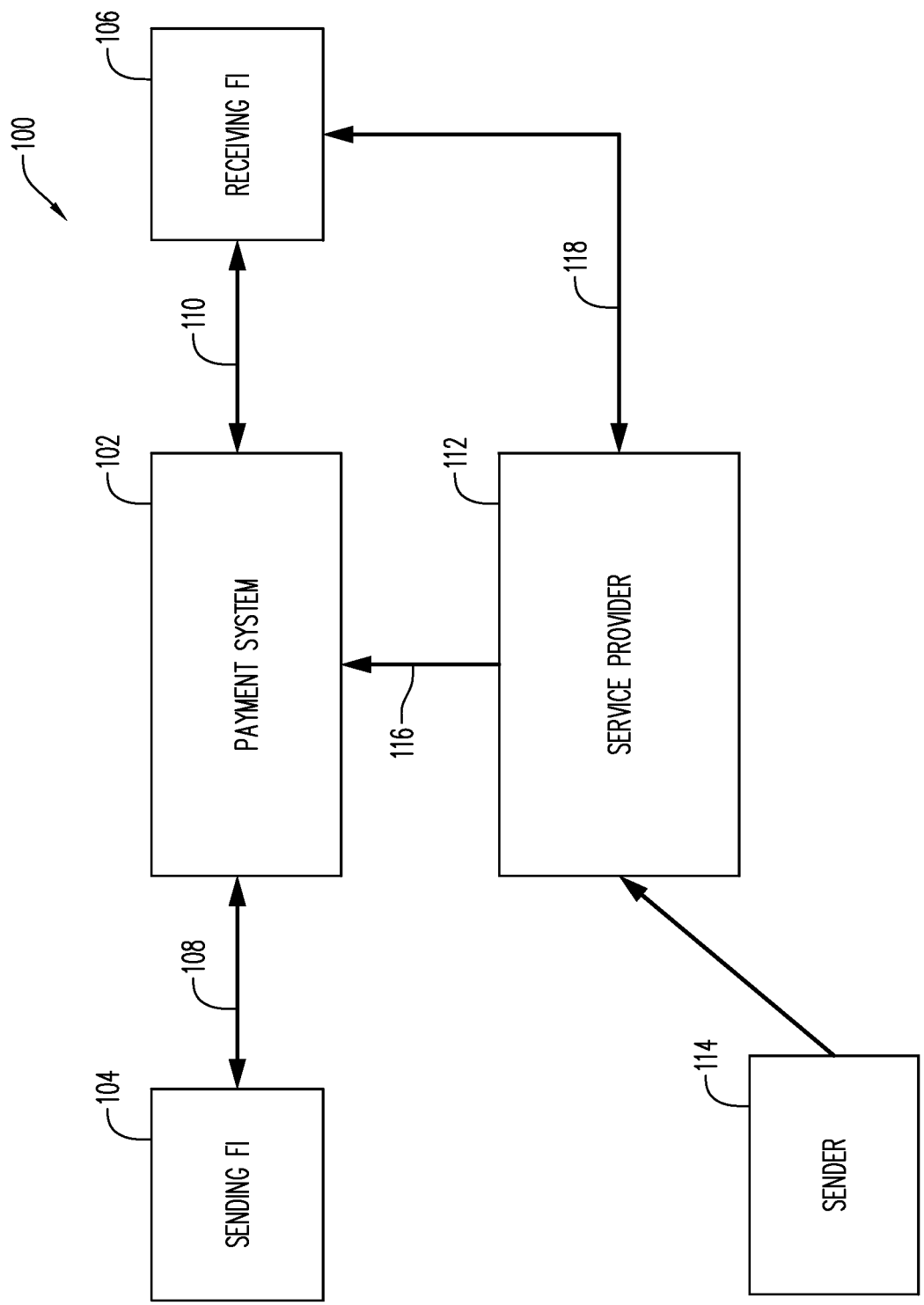
FIG. 1 is a block diagram that illustrates a remittance system provided according to some aspects of the present invention.

FIG. 1 is a block diagram that illustrates a remittance system 100 provided according to some aspects of the present invention.

At the heart of the remittance system 100 is a payment system 102. As will be seen, the payment system 102 operates to route and clear funds transfers from the payment card accounts of senders to the payment card accounts of recipients. One example of a suitable payment system is the Banknet system, which is well-known to those who are skilled in the art, and which is operated by the assignee hereof.

A major strength of a payment system such as the Banknet system is that it interlinks numerous financial institutions around the world. In practice the remittance system 100 may include many financial institutions that act as issuers of payment card accounts, but for purposes of illustration only two such FIs are shown in FIG. 1, namely the financial institution (sending FI 104) that issued the payment card account of the sender of a remittance, and the financial institution (receiving FI 106) that serves the designated recipient for the remittance. As indicated respectively at 108 and 110, the sending FI 104 and the receiving FI 106 are both connected by suitable data communication paths to the payment system 102. In some cases, the receiving FI 106 may be located in a different country from FI 104 so that any remittance transmitted between the two FIs 104, 106 is an international remittance.

Also shown as part of the remittance system 100 is a service provider 112 that provides functionality in accordance with aspects of the present invention. The service provider 112 may, for example, be a remittance services provider (RSP), and may be a point of contact between the remittance sender 114 and the remittance system 100. As will be understood in light of subsequent discussion, the service provider may initiate transactions in the payment system 102 (as indicated at 116), and may exchange information (as indicated at 118) with the receiving FI 106, to implement services that are provided in accordance with aspects of the present invention. The service provider 112 may obtain its access to the payment system 102 under contract with the payment system 102 or alternatively may be directly affiliated with and/or operated by the payment system 102.

Each block shown in FIG. 1, with the possible exception of block 114, should be understood to represent the indicated entity and also one or more computers operated by the indicated entity. Thus, in addition to showing relationships among various parties that make up the remittance system 100, FIG. 1 also depicts a network of computers that exchange information for the purpose of implementing remittance transactions in the system 100.

Figure 2:
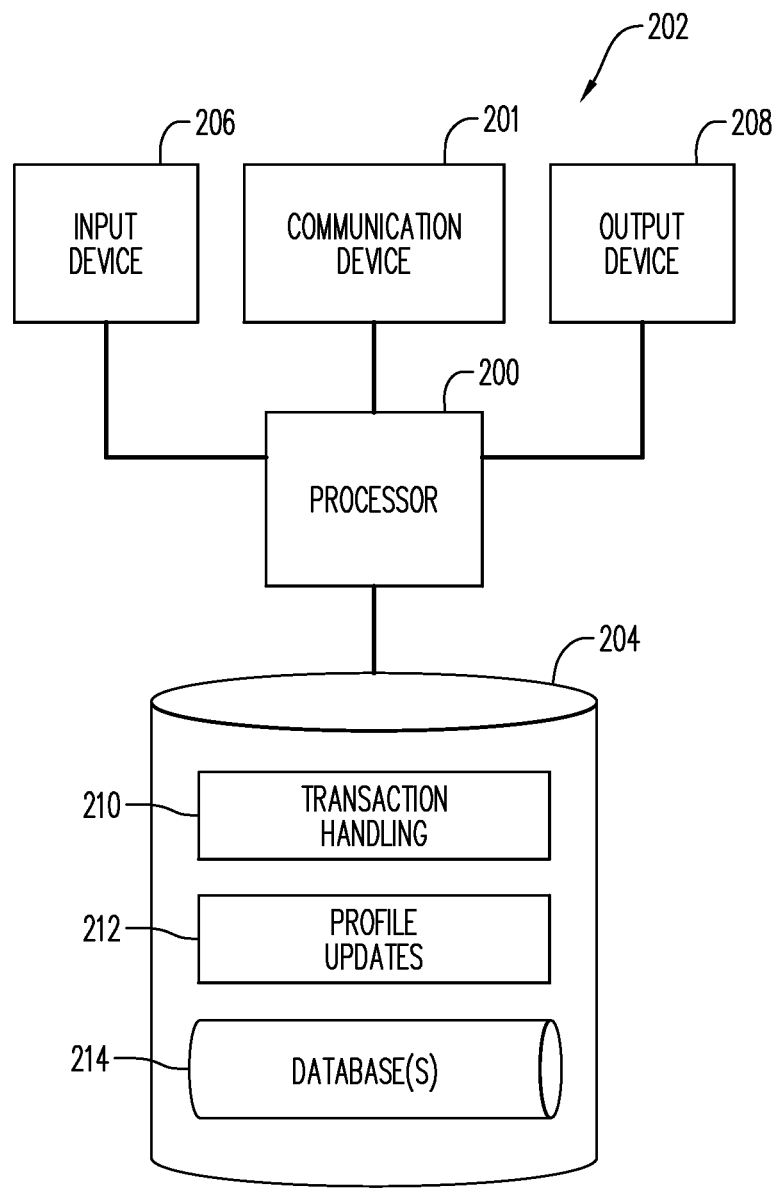
FIG. 2 is a block diagram that illustrates a computer system that may be operated by a service provider as part of the system of FIG. 1.

FIG. 2 is a block diagram representation of a computer system 202 that may be operated by the service provider 112, and that may effectively constitute the block 112 shown in FIG. 1. Some or all of the activities ascribed below to the service provider 112 may in fact be implemented by operation of the computer system 202.

The computer system 202 may be conventional in its hardware aspects but may be controlled by software to cause it to operate in accordance with aspects of the present invention.

The computer system 202 may include a computer processor 200 operatively coupled to a communication device 201, a storage device 204, an input device 206 and an output device 208.

The computer processor 200 may be constituted by one or more conventional processors. Processor 200 operates to execute processor-executable steps, contained in program instructions described below, so as to control the computer system 202 to provide desired functionality.

Communication device 201 may be used to facilitate communication with, for example, other devices (such as computers operated by the payment system 102 or the receiving FI 106).

Input device 206 may comprise one or more of any type of peripheral device typically used to input data into a computer. For example, the input device 206 may include a keyboard and a mouse. Output device 208 may comprise, for example, a display and/or a printer. (Input and/or output with the computer system may also or alternatively be via other channels, such as mobile telephone applications, SMS, web pages, etc.)

Storage device 204 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory.

Storage device 204 stores one or more programs for controlling processor 200. The programs comprise program instructions that contain processor-executable process steps of computer system 202, including, in some cases, process steps that constitute processes provided in accordance with principles of the present invention, as described in more detail below.

The programs may include an application 210 that allows the computer system 202 to handle remittance transactions as described herein. Another or related application program 212 allows the computer system 202 to update user profiles, as will also be described herein.

Storage device 204 may also store one or more databases 214 that contain data related to transactions initiated by the service provider 112, and/or data related to remittance services customers of the service provider 112.

The storage device 204 may also store other programs (not shown) that control operation of the computer system 202, such as one or more conventional operating systems, device drivers, communications software, web hosting software, software for performing server functions, etc.

Figure 3:
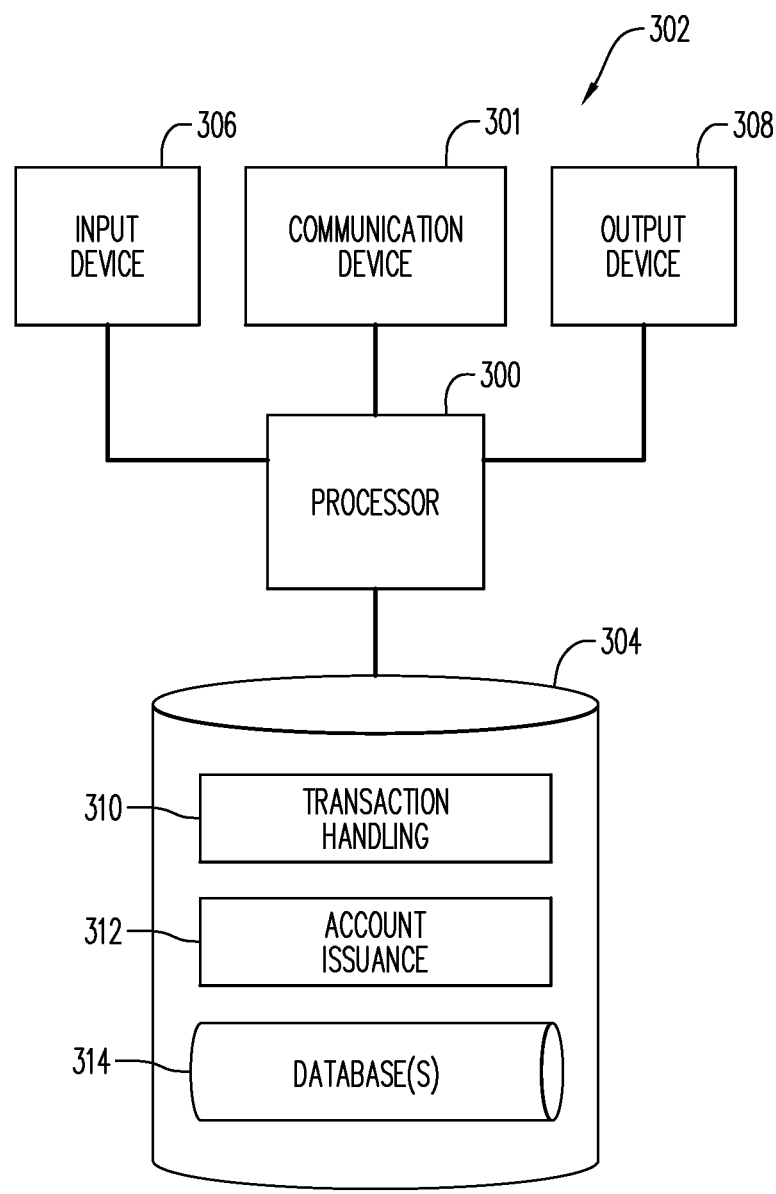
FIG. 3 is a block diagram that illustrates a computer system that may be operated by a receiving financial institution (FI) as part of the system of FIG. 1.

FIG. 3 is a block diagram representation of a computer system 302 that may be operated by the receiving FI 106 (FIG. 1). Thus the computer system 302 may constitute the block 106 shown in FIG. 1. Some or all of the activities ascribed below to the receiving FI 106 may be implemented via operation of the computer system 302.

In its hardware aspects, the computer system 302 may be conventional, and similar to the hardware components described above in connection with the computer system 202. The hardware aspects of the computer system 302 will therefore not be further described, except to mention that the computer system 302 may include a processor 300 in communication with a communication device 301, a storage device 304, an input device 306, and an output device 308.

The storage device 304 may store an application program 310 to control the computer system 302 to handle remittance transactions in accordance with aspects of the present invention and as described herein. The storage device may also store an application program 312 that manages issuance of payment card accounts in connection with remittance transactions, as described herein.

Continuing to refer to FIG. 3, the storage device 304 may also store one or more databases 314 that contain data related to remittance transactions handled by the computer system 302 and data related to payment card accounts issued by the receiving FI 106. The storage device 304 may also store other software programs for controlling the computer system 302, such as one or more conventional operating systems, device drivers, communications software, etc.

Figure 4:
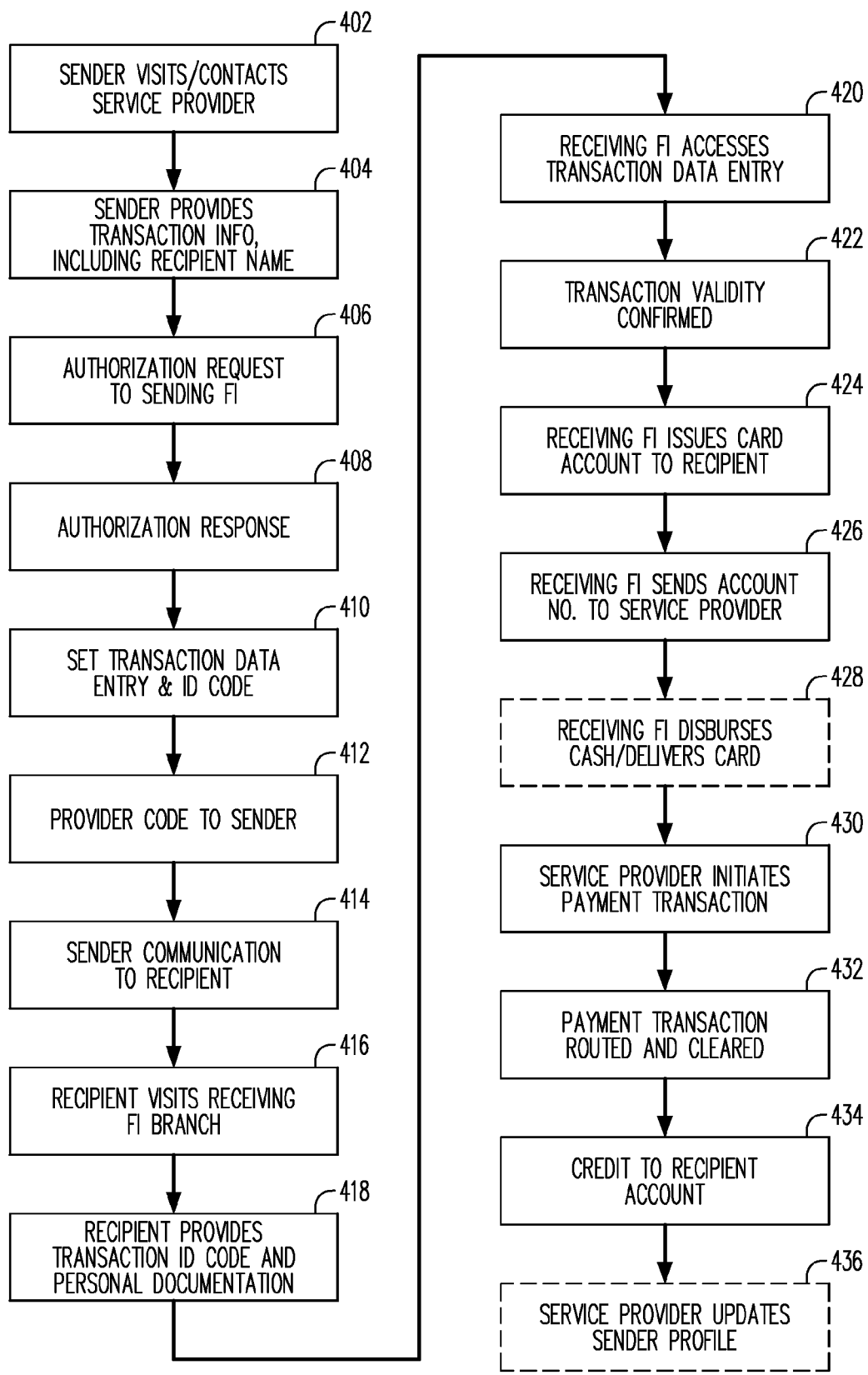
FIG. 4 is a flow chart that illustrates a process that may be performed in the system of FIG. 1 in accordance with aspects of the present invention.

FIG. 4 is a flow chart that illustrates a process that may be performed in the remittance system 100 in accordance with aspects of the present invention.

At 402 in FIG. 4, the sender who wishes to make the remittance transaction gets in contact with the service provider 112. For example, the sender may visit a store-front location operated by the service provider 112. Alternatively, the sender's contact with the service provider 112 may be via electronic communication. For example, the sender may operate a personal computer (not shown) or a smart mobile telephone (not shown) to establish a session with the computer system 202 operated by the service provider 112. In such cases, it is to be understood that the sender may previously have enrolled as a user with the service provider 112 and thus may have an online user account that is stored and serviced by the computer system 202. Thus, if the sender electronically contacts the service provider 112, the sender may do so by accessing his/her user account with the computer system 202.

At 404, the sender provides information to the service provider to specify details of the remittance transaction that the sender wishes to undertake. For example, the sender may specify the amount of money to be transferred and the sender's payment card account that is to be used for funding the remittance transaction. In at least some cases, the latter information (sender's payment card account number) may previously have been stored in the computer system 202 as part of the sender's user profile. It will be appreciated that the sender's payment card account number may identify a payment card account (e.g., a credit card account, debit card account or prepaid payment card account) that was previously issued to the sender by the sending FI 104. The transaction information provided by the sender also may identify the recipient, at least by name. For present purposes, it will be assumed that the recipient does not have a payment card account, and indeed does not have any kind of account with a financial institution.

At 406, the service provider 112 may initiate a transaction authorization request in the payment system 102. The transaction authorization request may be routed via the payment system 102 to the sending FI 104 using the payment card account number that identifies the sender's payment card account issued by the sending FI 104. The purpose of the transaction authorization request is to confirm the availability of funds or credit in the sender's account to support the proposed remittance transaction. Another purpose of the authorization request is to put a hold on the funds or credit in the sender's account, in the amount of the requested remittance, until the remittance transaction is completed.

At 408, the service provider 112 receives a response to the transaction authorization request. The response may be initiated via the sending FI 104 and routed via the payment system 102 back to the service provider 112. For present purposes it is assumed that the authorization response indicates approval of the transaction authorization request. If such is not the case, then the proposed remittance transaction may not go forward.

At 410, the computer system 202 operated by the service provider 112 may set up a transaction file/data record that represents the proposed remittance transaction. For example, this may include establishing and assigning a unique transaction identification code for the remittance transaction. In addition to the identification code, the transaction data record may store the remittance amount, the date of the request, the sender's name and funding payment card account number and the recipient's name. In some embodiments, the transaction data record may also indicate the country and/or region/city/town to which the remittance is being sent.

At 412, the service provider 112 discloses the transaction identification code to the sender, with the expectation that the sender will provide the code to the recipient, who will in turn use the code to claim the remittance. At the same time, the service provider 112 may inform the sender of the identities of financial institutions in the recipient's area that participate in the remittance system 100. That is, the service provider 112 may advise the sender as to the names of FIs that are able to serve as the receiving FI for the particular transaction.

In some embodiments, a retailer or other nonbank entity may perform at least some of the functions ascribed herein to the receiving FI. Accordingly, the term "receiving FI" should be understood to include any party that facilitates delivery of the remittance at the receiving end. In some embodiments, the service provider may manage card issuance to the recipient on behalf of an FI, and the recipient may visit an affiliated retail location to obtain the remittance in cash form while the recipient's card is being issued and mailed to the recipient.

At 414, the sender communicates the transaction identification code to the recipient. This may occur, for example, via a telephone conversation, an electronic mail message or a text message. In the same message, the sender may inform the recipient about participating FIs available to serve as the receiving FI for the transaction. At the same time, the sender may inform the recipient as to the amount of the proposed remittance.

At 416, the recipient visits the branch location of one of the participating FIs. (Alternatively, the location to be visited by the recipient may be a retail location belonging to a service provider that has a relationship with one or more participating FIs.)

At 418, the recipient provides to the participating FI (now to be referred to as the receiving FI 106) the transaction identification code that the recipient received from the sender. At the same time, the recipient may provide one or more personal identifying documents for himself/herself to the receiving FI 106. For example, the identifying documents may include a driver's license or other form of government issued identification document. With these documents, the receiving FI 106 may take steps to satisfy its "know your customer" (KYC) obligations as provided under governmental regulations.

At 420, the computer system 302 operated by the receiving FI 106 may use the transaction identification code to access the transaction data record that was generated for the transaction by the computer system 202 operated by the service provider 112. For example, this may occur by the computer system 302 accessing a web page hosted by the computer system 202 for the purpose of facilitating remittance transactions and submitting the transaction identification code to the computer system 202. With access by the computer system 302 to the data record for the transaction, the receiving FI 106 may recognize that the validity of the transaction is confirmed (block 422, FIG. 4) and that funding is available and has been set aside for the remittance transaction. As part of confirming the validity of the transaction, the receiving FI 106 may confirm that the identity of the recipient as stated in the transaction data record at the computer system 202 matches the identifying document(s) provided by the recipient at the receiving FI branch location.

At 424, after confirmation of the validity of the transaction, the receiving FI 106 may issue a payment card account to the recipient. This account may, for example, be a debit card account linked to a demand deposit account (DDA) that is also opened at the same time for the recipient at the receiving FI 106, or alternatively the newly issued payment card account may be a prepaid payment card account. As part of the issuance of the recipient's payment card account, the receiving FI 106 assigns a payment card account number that identifies the account for purposes of routing transactions to the recipient's account via the payment system 102.

At 426, the receiving FI 106 communicates, to the computer system 202 operated by the service provider 112, the payment card account number for the recipient's newly issued payment card account number. The communication from the receiving FI 106 (from the computer system 302) to the computer system 202 may again identify the relevant remittance transaction via the transaction identification code so that the computer system 202 recognizes that the payment card account number identifies a target recipient account for the remittance transaction.

At 428, and in response to receiving the recipient's payment card account number from the receiving FI 106, the service provider 112 may initiate a payment transaction in the payment system 102 to route a transfer of funds from the sender's payment card account to the recipient's newly issued payment card account. The routing of the payment transaction in the payment system 102 may use the payment card account number communicated from the receiving FI 106 to the service provider 112. It will be appreciated that the payment transaction consummates the remittance for which authorization was requested by the service provider 112 at step 406. As is explained in the above-referenced '929 published patent application, and as is known to those who are skilled in the art, a "payment transaction" in a payment card system is one in which funds are to be transferred via the payment card system from a funding FI to a target payment card account; this is in contradistinction to a conventional "purchase transaction" in a payment card system, in which funds flow in the opposite direction, i.e., out of the payment card account in question.

At this point, the receiving FI 106 may, in some embodiments, disburse some or all of the remittance to the recipient in cash, as indicated at 430. The receiving FI 106 may be willing to do this because (a) it effectively already has an assurance via the service provider 112 that a transfer of funds to the recipient's payment card account will be consummated shortly; and (b) the receiving FI 106 may believe that it has obtained adequate proof of the recipient's identity. The disbursement of cash at this point may also make the remittance system attractive and convenient for the recipient, as part of the recipient's introduction to the system. In addition or alternatively, the receiving FI 106 may issue a payment card to the recipient by which the recipient will be able to access the newly issued payment card account. However, in some embodiments, issuance of the payment card itself to the recipient may require a day or a few days for processing by the payment card supplier for the receiving FI 106. For example, the payment card may be personalized by the payment card supplier and then mailed by the payment card supplier to the recipient's mailing address.

At 432 in FIG. 4, the payment transaction is routed, cleared and settled. This may take place in accordance with conventional payment card system practices for payment transactions. For example, the funds may be transferred from the sender's account to a settlement account at the sending FI 104, and then from the sending FI settlement account to the receiving FI 106 for posting to the recipient's newly issued account. Then, at 434, the funds transfer is credited to the recipient's account (e.g., to cover the cash disbursement that may have previously been made by the receiving FI 106 to the recipient).

At 436, the service provider 112 may use the recipient's payment card account number, as provided by the receiving FI 106, to update the sender's user profile to add the recipient and his/her payment card account number as a potential recipient for future remittance transactions. With this information added to the sender's user profile, the sender may be enabled to easily select the recipient for additional remittance transactions in the future, which may be readily routed from the sender's payment card account to the recipient's payment card account, in accordance with known techniques. The foregoing assumes that the sender has a user profile with the service provider 112. Alternatively, however, the service provider may communicate the recipient information (e.g., recipient's name and payment card account number) to another party (such as the sending FI 104) to allow the other party to update the sender's user profile with the other party.

The process as depicted in FIG. 4 assumes that the recipient claims the remittance within a fairly short time, say within a few days or a week. In some embodiments, the hold placed on the sender's payment card account for the remittance amount may only last for a limited number of days, and may be released at the end of that time, at which point the remittance transaction would be deemed "stale", and would no longer be claimable by the recipient or supported by the service provider 112. However, there may also be a process available wherein the sender is able to renew the hold on his/her payment card account to extend the available life of the remittance transaction.

One beneficial feature of the system may be that the funding is not charged to the sender's account until the remittance transaction is ready to be completed.

With the process as described herein in conjunction with FIG. 4, a payment-card-system-based remittance system is operative to consummate a remittance transaction directed to a recipient who is not the holder of a payment card account at the time that the sender first launches the remittance transaction. With this process, the recipient selects the receiving FI from among participating locations, claims the remittance using a dedicated transaction identification code, and is issued a new payment card account by the receiving FI in aid of the current transaction. In this way the remittance system can conveniently serve a previously "unbanked" recipient, while transforming the recipient into a bank customer and holder of a payment card account. This also adds to the opportunities for the receiving FI to serve as the receiving end of remittance transactions for individuals who are not yet customers of the receiving FI.

Figure 5:
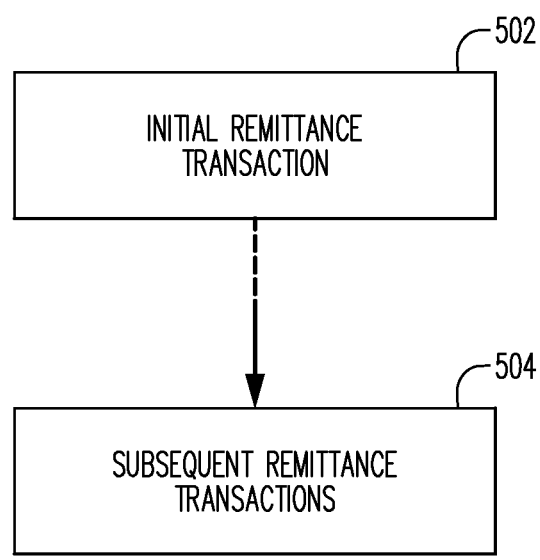
FIG. 5 is a flow chart that illustrates other aspects of operations of the system of FIG. 1.

FIG. 5 is a flow chart that illustrates other aspects of operations of the remittance system 100. Block 502 in FIG. 5 represents the initial remittance transaction to benefit the previously unbanked recipient as depicted in FIG. 4. Block 504 represents subsequent remittance transactions to the same recipient, which may use as a target payment card account the account that was issued to the recipient in connection with the transaction of block 502. It will be appreciated that one or more of the block 504 remittance transactions may take place a week or more later than the initial remittance transaction of block 502. These may be like conventional remittance transactions in a payment-card-account-to-payment-card-account remittance system.

In embodiments described above, the remittance transaction may be funded from a payment card account that belongs to the sender. Alternatively, however, the funding may be from another source, such as cash delivered by the sender to the sending FI, or from a demand deposit account (DDA) or other account owned by the sender at the sending FI, or from an account at another institution. In the latter case, it may be advisable for the sender to have a relationship with the sending FI so that "know your customer" (KYC) requirements may be met.

Processes portrayed herein as being performed by one computer may in practice be divided among two or more computers. Processes portrayed herein as being performed by two or more computers may in practice be performed by a single computer. For example, in the case of the receiving FI, one computer (e.g., a client computer) may be operated by an employee of the receiving FI to enter information about the recipient and the remittance transaction, in cooperation with a separate server computer (not shown; also operated by the receiving FI) which handles communication with the service provider, issuance of the new payment card account, maintenance of customer and account databases, etc.

As used herein and in the appended claims, the term "computer" refers to a single computer or to two or more computers in communication with each other and/or operated by a single organization or by two or more organizations that are partly or entirely under common ownership and/or control.

As used herein and in the appended claims, the term "processor" refers to one processor or two or more processors that are in communication with each other.

As used herein and in the appended claims, the term "memory" refers to one, two or more memory and/or data storage devices.

The flow charts and descriptions thereof herein should not be understood to prescribe a fixed order of performing the method steps described therein. Rather the method steps may be performed in any order that is practicable.

As used herein and in the appended claims, the term "payment card account" includes a credit card account or a deposit account that the account holder may access using a debit card, or a prepaid payment card account. The term "payment card account number" includes a number that identifies a payment card account or a number carried by a payment card, or a number that is used to route a transaction in a payment system that handles debit card and/or credit card transactions. The term "payment card" includes a credit card or a debit card or a prepaid payment card.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
receiving, at a service provider computer, a request for a transfer of funds from a sender's payment card account to a recipient without a payment card account;
transmitting, by the service provider computer via a payment card system to a financial institution that issued the sender's payment card account, a hold on the sender's payment card account in an amount to cover the transfer of funds;
establishing, by the service provider computer, a data record including a transaction identification code, wherein the data record is indicative of the requested transfer of funds;
making the data record in the service provider computer available to a receiving financial institution (FI);
disclosing, by the service provider computer, the transaction identification code to the sender;
receiving in the service provider computer, from the receiving FI, recipient account information, the recipient account information indicative of a payment card account number that identifies a payment card account newly issued by the receiving FI to the recipient after the data record was accessed, and after the recipient provided the transaction identification code and a personal identification document to the receiving FI, wherein the recipient received the transaction identification code from the sender; and
initiating, by the service provider computer, in the payment card system, a payment transaction to route the amount of the requested transfer of funds from the sender's payment card account to the recipient's newly issued payment card account, the payment transaction identifying the new payment card account issued to the recipient as a target for the funds transfer.

2. The method of claim 1, further comprising:
sending, from the service provider computer to a sending computer of a sending financial institution, a message to associate the recipient account information with a user profile that belongs to the sender, the sending FI having issued a payment card account to the sender.

3. The method of claim 1, further comprising:
the service provider computer associating the recipient account information with a user profile that belongs to the sender.

4. The method of claim 1, wherein the service provider computer receives the request for the transfer of funds from a payment services provider.

5. The method of claim 1, wherein the request for the transfer of funds includes a payment card account number that identifies a payment card account that belongs to the sender.

6. The method of claim 1, wherein the requested transfer of funds is charged to the sender's account only upon consummation of the transfer.

7. An apparatus, comprising:
a processor;
a communication device operably connected to the processor; and
a non-transitory storage device operably connected to the processor, the storage device storing instructions configured to cause the processor to:
receive a request for a transfer of funds from a sender's payment card account to a recipient without a payment card account;
transmit, via a payment card system to a financial institution that issued the sender's payment card account, a hold on the sender's payment card account in an amount to cover the transfer of funds;
establish a data record including a transaction identification code, wherein the data record is indicative of the requested transfer of funds;
make the data record available to a receiving financial institution (FI);
disclose the transaction identification code to the sender;
receive from the receiving FI recipient account information, the recipient account information indicative of a payment card account number that identifies a payment card account newly issued by the receiving FI to the recipient after the data record was accessed, and after the recipient provided the transaction identification code and a personal identification document to the receiving FI, wherein the recipient received the transaction identification code from the sender; and
initiate in the payment card system, a payment transaction to route the amount of the requested transfer of funds from the sender's payment card account to the recipient's newly issued payment card account, the payment transaction identifying the new payment card account issued to the recipient as a target for the funds transfer.

* * * * *